United States Patent
Pinkerton et al.

(10) Patent No.: US 9,938,191 B2
(45) Date of Patent: Apr. 10, 2018

(54) ESTABLISHING CONTROL OF OIL AND GAS PRODUCING WELLBORE THROUGH APPLICATION OF SELF-DEGRADING PARTICULATES

(71) Applicant: HALLIBURTON ENERGY SERVICES, INC., Houston, TX (US)

(72) Inventors: Hap Alan Pinkerton, Claremore, OK (US); William Vincent Grieser, Yukon, OK (US); Brandon Duane Phillips, Tuttle, OK (US); James Daniel Futrell Dulin, Mustang, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/527,672

(22) PCT Filed: Jan. 23, 2015

(86) PCT No.: PCT/US2015/012753
§ 371 (c)(1),
(2) Date: May 17, 2017

(87) PCT Pub. No.: WO2016/118167
PCT Pub. Date: Jul. 28, 2016

(65) Prior Publication Data
US 2017/0341981 A1 Nov. 30, 2017

(51) Int. Cl.
*C04B 28/02* (2006.01)
*C09K 8/42* (2006.01)
(Continued)

(52) U.S. Cl.
CPC .............. *C04B 28/02* (2013.01); *C09K 8/426* (2013.01); *C09K 8/50* (2013.01); *C09K 8/665* (2013.01); *C09K 8/78* (2013.01); *E21B 43/267* (2013.01)

(58) Field of Classification Search
CPC .......... C09K 8/426; C09K 8/50; C09K 8/865; C09K 8/78; E21B 43/267
(Continued)

(56) References Cited

U.S. PATENT DOCUMENTS 3,967,681 A    7/1976 Curzon
4,749,038 A    6/1988 Shelley
(Continued)

OTHER PUBLICATIONS

Ingram, Stephen; DUG 2011—Re-Fracturing; 2011; pp. 1-23.
(Continued)

*Primary Examiner* — Silvana C Runyan
(74) *Attorney, Agent, or Firm* — Polsinelli PC

(57) ABSTRACT

Remediation of a hydrocarbon producing well bore in a subterranean formation includes injecting fluid containing self-degrading particulates into the well bore in order to stop production of hydrocarbon from the well bore prior to commencement of remedial operations and to temporarily seal the well bore from fluid transmission between the well bore and the formation prior to commencement of the remedial operations, and commencing the remedial operations upon the well bore. Examples of the remedial operations include injecting weighted fluid into the well bore, inserting a down-hole tool into the well bore, casing treatment, annulus treatment, well bore wall treatment, cementing, and refracturing. For refracturing, the fluid containing the self-degrading particulates can be injected until a down-hole pressure exceeds a fracture breakdown pressure of new fractures that will be produced by a perforating tool lowered into the well bore.

20 Claims, 12 Drawing Sheets

(51) Int. Cl.
    *C09K 8/50* (2006.01)
    *C09K 8/66* (2006.01)
    *C09K 8/78* (2006.01)
    *E21B 43/267* (2006.01)

(58) Field of Classification Search
    USPC .................................................. 166/280.1
    See application file for complete search history.

(56) References Cited

U.S. PATENT DOCUMENTS

| | | | |
|---|---|---|---|
| 5,894,888 | A | 4/1999 | Wiemers et al. |
| 7,690,427 | B2 | 4/2010 | Rispler |
| 8,109,335 | B2 | 2/2012 | Luo et al. |
| 2007/0017675 | A1* | 1/2007 | Hammami ............ E21B 33/13 166/278 |
| 2007/0074869 | A1* | 4/2007 | Svoboda ................ C04B 28/02 166/294 |
| 2008/0093073 | A1* | 4/2008 | Bustos .................... C09K 8/68 166/279 |
| 2009/0037112 | A1* | 2/2009 | Soliman ................ E21B 43/14 702/11 |
| 2009/0151952 | A1 | 6/2009 | Walton |
| 2013/0133887 | A1 | 5/2013 | Todd |
| 2013/0264054 | A1 | 10/2013 | East et al. |

OTHER PUBLICATIONS

SPE 166434; Breakdown Pressure Determination—A Fracture Mechanics Approach; Sep. 30-Oct. 2, 2013; pp. 1-18.
Iverson, William; SPE 29598; Closure Street Calculations in Anisotropic Formations; Mar. 20-22, 1995; pp. 1-14.
Allison, Dave; CSUG/SPE 149221; Restimulation of Wells using Biodegradable Particulates as Temporary Diverting Agents; Nov. 15-17, 2011; pp. 1-11.
Ingram, Stephen; Journal of Petroleum Technology—Methods Improve Stimulation Efficiency of Perforation Clusters in Completions; © 2003-2014 Society of Petroleum Engineers; retrieved Jan. 20, 2015; pp. 1-7.
Plains Exploration & Production Company Inglewood Oil Field Hydraulic Fracturing Report; Version 5 Jul. 13, 2012; pp. 1-115.
Fracturing Technology for Improved Long-Term Production; AccessFrac; Stimulation Service; 2012 ; pp. 1-2.
Grieser, Bill Halliburton Energy Services; Sustainable Strategies for Shale Plays; What makes Economic Sense for your Reservoir? 2005; pp. 1-32.
Deeg, Wolfgang, Fracture-Stimulation of Horizontal or Deviated Wells, Chapter 4 of Stimulation of Horizontal and Multilateral Wells, 2000, pp. 71-98, Halliburton Energy Services, Inc., Houston, TX.
Deeg, Wolfgang, Rock Mechanics: Effects and Implications , Chapter 3 of Stimulation of Horizontal and Multilateral Wells, 2000, pp. 45-68, Halliburton Energy Services, Inc., Houston, TX.
Halliburton; Production Enhancement; "Re-stimulation of well with collapsed casing;" Texas—Barnett Shale; Jul. 2011; pp. 1-2.
Bryant, Stephen Andrew; Simulating Refracting Treatments that Employ Diverting Agents on Horizontal Wells; Aug. 2013; pp. 1-180.
Halliburton; Production Enhancement; "Successful Restimulation of Barnett Shale Well using Biodegradable BioVert NWB Diverting Agent" Texas—Restimulation of a Shale Well; Jun. 2011; pp. 1-2.
Halliburton; Mature Fields Solutions Book; 2014; pp. 1-171.
Halliburton; Wireline and Perforating Services; Jan. 2012; pp. 1-15.
Kirksey, Jim; Well Engineering Manager; Schlumberger Carbon Services; "Squeeze Cementing;" Oct. 17, 2013.
PetroWiki; "Fracture Mechanics;" Society of Petroleum Engineers; Sep. 16, 2013.
Halliburton; Multi-Stage Fracturing Technology; Stimulation; "Biovert NWB Biodegradable Diverting Agent—Manage Fluid and Proppant Placement to Improve Multi-stage Fracturing Efficiency;" Jun. 2011; pp. 1-2.
International Search Report and Written Opinion; PCT Application No. PCT/US2015/012753; dated Oct. 6, 2015.

* cited by examiner

ESTABLISHING CONTROL OF OIL AND GAS PRODUCING WELLBORE THROUGH APPLICATION OF SELF-DEGRADING PARTICULATES

FIELD

The subject matter herein generally relates to well bore remediation, and in particular, well bore restimulation by hydraulic fracturing.

BACKGROUND

Subterranean hydrocarbon containing formations penetrated by well bores are commonly stimulated by creating fractures in the formations. Typically a fracturing fluid such as a gelled aqueous fluid is pumped into the formation at a rate and pressure such that fractures are created and extended therein. A propping material such as sand is typically deposited in the fractures so that they are prevented from completely closing when the formation is returned to production and provide flow passages through which hydrocarbons readily flow to the well bore.

Wells in certain geographic locations such as in shale formations may require an initial fracturing to be economically productive. After a number of years, the hydrocarbon production level will decline to a level of marginal economic viability. At that time the well is evaluated for possible restimulation. Because restimulation costs a fraction of the cost of drilling and initially fracturing a well, restimulation may be attempted when there is only a fair chance of obtaining a modest increase in production level.

Self-degrading particulates have been used for various processes including restimulation of oil and gas wells. Before a refracturing treatment, new perforations are added to promote better lateral coverage. Self-degrading particulates are incorporated into the refracturing treatment to provide better lateral coverage and increase stimulation effectiveness. The refracturing treatment includes a continuous pumping of fracturing fluid, with varying levels of propping material and self-degrading particulates added to the fracturing fluid at different times in accordance with a treatment schedule. The treatment schedule includes multiple phases of fluid injection with propping material separated by diversion sequences of fluid injection with self-degrading particulates.

DETAILED DESCRIPTION

Figure 1:
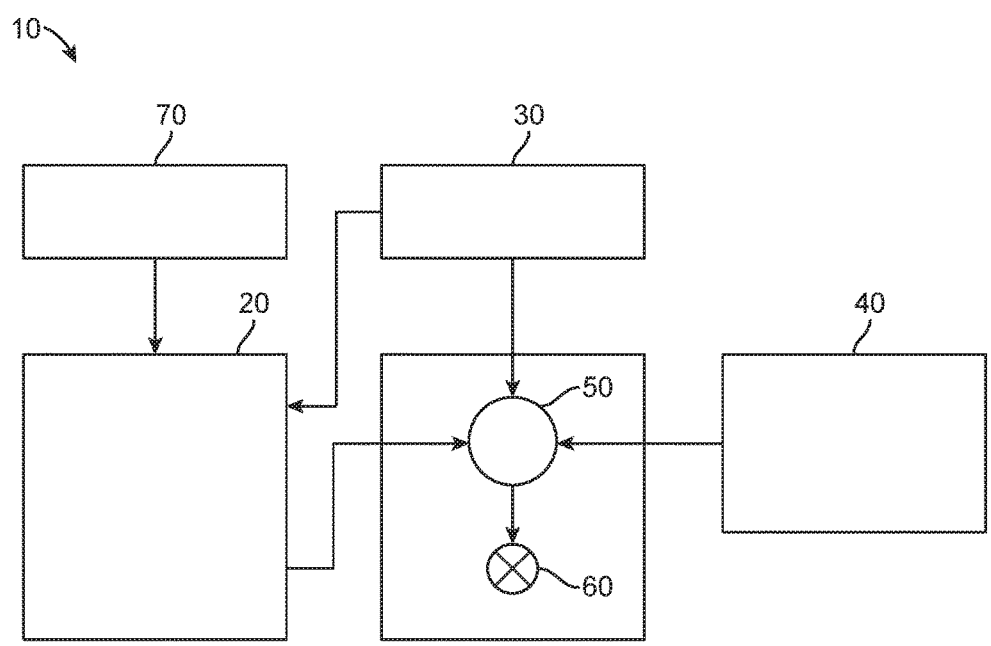
FIG. 1 is a diagram illustrating an example of a fracturing system that may be used in accordance with certain embodiments of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object.

Remedial operations are often required upon a well bore that has been producing hydrocarbon such as oil and gas. For example, after a number of years, the hydrocarbon production level will decline to a level of marginal economic viability. At that time the well is evaluated for possible restimulation.

Wells in certain geographic locations such as in shale formations may require an initial fracturing to be economically productive. Wells that have been initially fractured are often successfully restimulated by refracturing. The initial fracturing and the refracturing involve injection of fracturing fluid into the well bore. In most cases, the fracturing fluids include particulate proppant material sized to enter into and prop open fractures created in the subterranean formation surrounding the well bore by injecting the fracturing fluid under pressure into the well bore. For example, 100 mesh sand, 40/70 and 30/50 sieve sizes, is commonly used as proppant material.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50, and the system 10 resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, self-degrading particulates, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, just additives at other times, and combinations of those components at yet other times.

Figure 2:
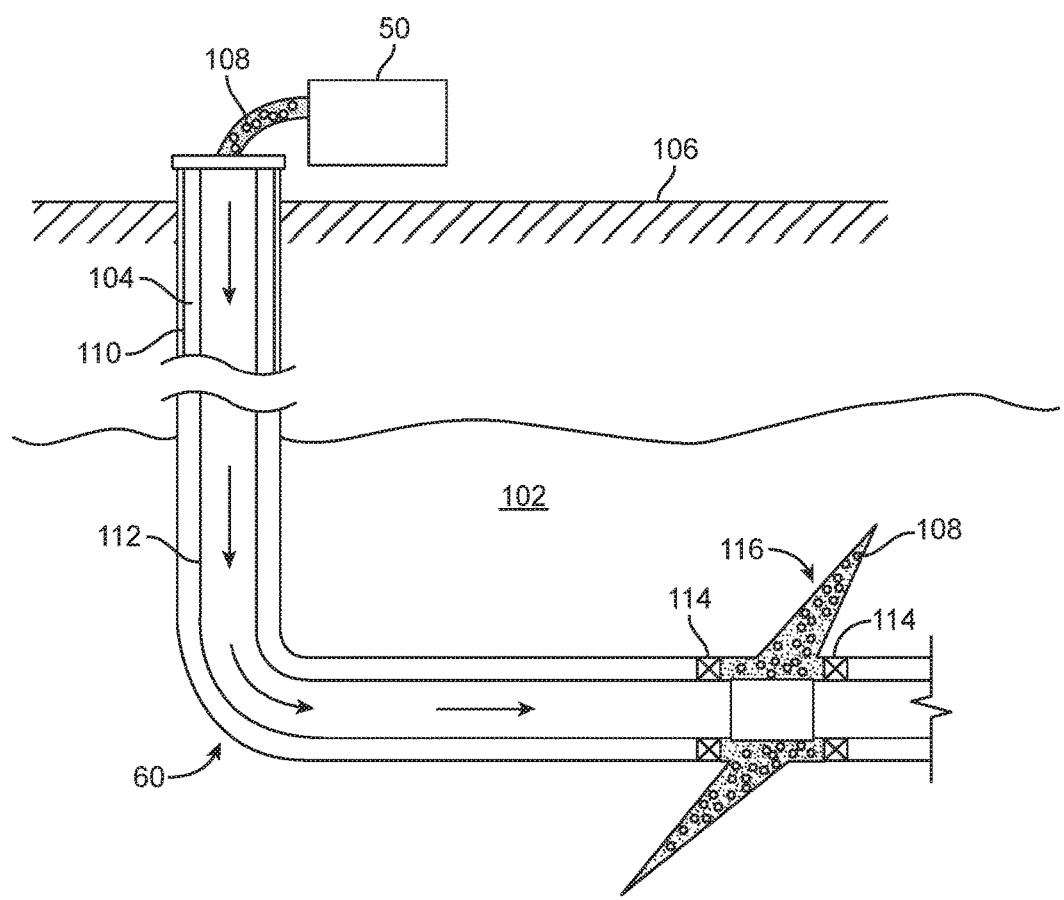
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating tool, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Remedial operations are often required upon a well bore that has been producing hydrocarbon such as oil and gas. For example, after a number of years, the hydrocarbon production level will decline to a level of marginal economic viability. At that time the well is evaluated for possible restimulation.

In accordance with the present disclosure, control of a hydrocarbon producing well bore needing remedial operations is established by injecting fluid containing self-degrading particulates into the well bore in order to stop production of hydrocarbon from the well bore prior to commencement of the remedial operations and to temporarily seal the well bore from fluid transmission between the well bore and the formation.

For certain remedial operations, the stopping of the production of the hydrocarbon from the well bore may significantly reduce interference of the hydrocarbon with the remedial operations to be performed, and the temporary sealing of the well bore from fluid transmission between the well bore and the formation may significantly reduce loss of fluid injected into the well bore during the remedial operations. The initial sealing of the well bore from fluid transmission between the well bore and the formation may enable following treatment operations to provide better access to new areas of the well bore that were previously untreated or undertreated.

For the case of restimulation, the initial sealing of the well bore is an added initial step that may prevent old fractured areas from being extended outside of a productive layer of the formation so that re-fracturing occurs at new perforations and new fractures are extended from the new perforations into previously unfractured areas of the productive layer.

Figure 3:
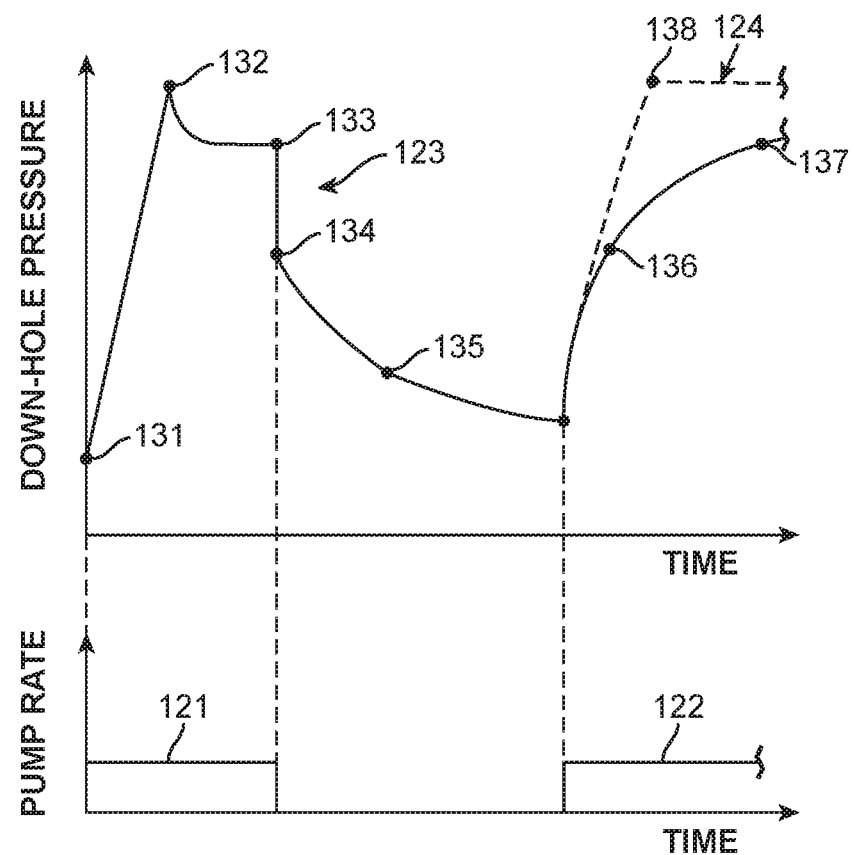
FIG. 3 is a set of graphs of pump rate and down-hole pressure as a function of time during fracturing and re-fracturing operations.

FIG. 3 shows general functional relationships of pump rate 121 during fracturing, pump rate 122 during re-fracturing, and the down-hole pressure 123 in response to the pump rate. In this example, the graph 123 of the down-hole pressure as a function of time has certain features that occur at various pressures that are characteristics of the subterranean formation. Before pumping fracturing fluid into the wellbore, the down-hole pressure 123 is at a point 131 of hydrostatic pressure. This hydrostatic pressure is given by the formula P=Ps+mgh, where "Ps" is the pressure in the wellbore at the surface, "m" is the mass density of the fracturing fluid, "g" is the acceleration due to gravity, and "h" is the depth below the surface where the fracturing is taking place in the formation surrounding the well bore.

In response to a constant pump rate 121, the down-hole pressure rises until reaching a point 132 at a fracture breakdown pressure, which is the pressure needed to initiate a fracture in the formation surrounding the wellbore. At this point, the rising pressure is relieved by a fracture that propagates from the well bore into the surrounding formation. The pressure drops and levels off at a point 133 at a fracture extension pressure, which is the pressure necessary to extend the fracture once initiated.

In the example of FIG. 3, the pump at the surface is shut off once the fracture extension pressure is reached, so that the down-hole pressure 123 drops suddenly to a point 134 at a shut-in pressure. The difference between the extension pressure and the shut-in pressure is due to pressure drop from friction to fluid flow along the fracture from the bore hole into the formation due to the pumping. This pressure drop per unit length of the fracture is known as the fracture gradient, which is typically on the order of 0.2 psi per foot. The pressure continues to drop more slowly until an inflection point 135 is reached at a fracture closing pressure. When the fracture is closing, the pressure drop per unit length of the fracture is typically on the order of 0.1 psi per foot.

In the example of FIG. 3, the down-hole pressure continues to drop unit the pump is again turned on to pump at a constant rate. Then the down-hole pressure rises at a rapid rate unit reaching an inflection point 136 at a fracture re-opening pressure. Then the down-hole pressure rises at a diminishing rate until the down-hole pressure levels off at a point 137 at the fracture extension pressure.

For a particular subterranean formation surrounding a wellbore, the fracture breakdown pressure, fracture extension pressure, fracture closing pressure, and fracture re-opening pressure can be determined experimentally by measuring the down-hole pressure while pumping fluid into the well bore to generate graphs similar to those shown in FIG. 3. If certain properties and characteristics of the subterranean formation are known, then the fracture breakdown pressure, fracture extension pressure, fracture closing pressure, and fracture re-opening pressure can be estimated by theoretical calculations and "rules of thumb."

For example, an estimate of the fracture breakdown pressure (Pb) is calculated as $Pb=3(\sigma min)-(\sigma max)+T-Pp$., where $\sigma min$ is the minimum horizontal stress on the formation, $\sigma max$ is the maximum horizontal stress on the formation, T is the tensile force required to part the rock of the formation, and Pp is the pore pressure of fluid in the formation. The tensile force T required to part the rock can be estimated as $T=UCS/10$, where UCS is the unconfined compressive strength of the rock. An estimate of the fracture extension pressure is calculated as $Pext=3(\sigma min)-(\sigma max)-Pp$. An estimate of the fracture closing pressure is calculated as $\sigma min\_A=EH/EV*(vV/(1-vH))*[\sigma v-\alpha Pp]+\alpha Pp+\sigma tec$ where E is Young's modulus, v is Poisson's ratio, $\sigma v$ is the vertical stress, $\alpha$ is Biot's constant (which for typical formations of interest, ranges from 0.75 to 1.0), and $\sigma tec$ is the tectonic stress. For a vertical fracture, this estimate of the fracture closing pressure reduces to: $\sigma min=(v/(1-v))*[\sigma 1-\alpha Pp]+\alpha Pp+\sigma tec$, where $\sigma 1$ is the overburden stress.

When self-degrading particulates are added to fluid pumped into the well bore, the self-degrading particulates can prevent a previously existing fracture from opening at the fracture re-opening pressure or from being re-extended at the fracture extending pressure. For example, the dashed curve 124 shows the down-hole pressure as a function of time when self-degrading particulates have been added to the fracturing fluid during the re-fracturing pumping 122. The self-degrading particulates clog the pores between the proppant in the fracture, and as the fracture walls begin to separate from the proppant, any opening is filled with the self-degrading particulates. Thus, the increased down-hole pressure is prevented from reaching the tip of the fracture away from the well bore, so that the down-hole pressure increases past the fracture extension pressure without extending the fracture. The fracture does not begin extending until the pressure reaches a point 138 at a fracture re-initiation pressure, which is greater than the fracture extension pressure. At the fracture re-initiation pressure, new fractures are initiated in the formation and the self-degrading particulates are unable to seal the new fractures initiated in the formation, but the pressure remains above the fracture extension pressure of the formation when the fluid containing the self-degrading particulates continues to be pumped into the well bore. Therefore the self-degrading particulates can be used to seal a fractured well bore so that fluid flow from the well bore into the surrounding formation is shut off for down-hole pressures up to and exceeding the fracture extension pressure of the formation.

It is also possible to use the self-degrading particulates to seal a fractured well bore so that fluid flow from the well bore into the surrounding formation is shut off for down-hole pressures exceeding a breakdown pressure for hydraulically initiating fractures after new perforations are made in the well bore, for example by perforating the well bore casing or perforating the well bore wall of the formation surrounding the well bore. If there is a casing sealing a weak unfractured area of the formation wall from down-hole fluid in the casing, then perforation of the casing may expose this weak area of the formation to initiate hydraulic fracturing of this weak area while other areas of the formation remain sealed by the self-degrading particulates.

If new perforations are made in the borehole wall at strong areas of the formation, then it may be possible to initiate hydraulic fracturing of these areas of the formation while other areas of the formation remain sealed by the self-degrading particulates. For example, the new perforations in the well bore wall are made by the same kind of down-hole tool used to perforate a wellbore casing. For example, the down-hole tool uses a shaped explosive charge or a water jet. Such a tool can perforate the well bore wall when a well bore casing is perforated. Such a tool can also perforate the well bore wall at an area of the well bore where there is no casing. By perforating the well bore wall, the rock at the perforation is fractured at a localized area, so that a lower downhole fluid pressure may initiate hydraulic fracturing at this localized area.

There are a number of different kinds of self-degrading particulates that can be used for sealing a previously existing fracture and preventing the previously existing fracture from opening at the fracture re-opening pressure and being re-extended at the fracture extending pressure. Suitable self-degrading particulates include benzoic acid flakes, naphthalene flakes, crushed rock salt, Gilsonite™ lost circulation additive by Halliburton Energy Services, Inc., wax beads, and beads made of degradable polymer such as polylactic acid. The choice of the self-degrading particle is based on availability, cost, and compatibility with formation fluids and fracturing fluids that the self-degrading particulates would be exposed to. For example, rock salt is inexpensive but may degrade too fast by dissolution when exposed to water-based fracturing fluids. Degradation of naphthalene flakes, Gilsonite™ lost circulation additive, or wax beads may be dependent on dissolution in liquid hydrocarbon from the formation. Biodegradable polymer can be insoluble in fracturing and formation fluids until the polymer has been degraded by biological organisms, so that there is a high level of confidence that the polymer will perform its sealing function over the length of time needed for subsequent remedial treatments, and then degrade. Suitable biodegradable polymer is sold as BIOVERT® NWB diverting agent by Halliburton Energy Services, Inc.

For sealing a fracked well bore prior to remedial refracturing treatments, a particle size of 8 mesh to 200 mesh is suitable for the self-degrading particulates, and the self-degrading particulates are mixed into the well bore fluid at a concentration of 0.2 to 2.0 pounds of particles per gallon of fluid. To seal preexisting fractures that may or may not be propped open with proppant, particles having different sizes distributed over this range can be used to seal the fractures. In the case of a fracture not already filled with proppant, the larger size self-degrading particulates get jammed in the wider regions of the preexisting fracture. In either case, the smaller size self-degrading particulates fill in and seal the spaces between the larger size particles of proppant or self-degrading particulates. The particle size distribution can be bi-modal to include one mode of rather uniformly large size particles for jamming in between the walls of a fracture, and another mode of different sized smaller particles for filling in the gaps between the large size particles.

Figure 4:
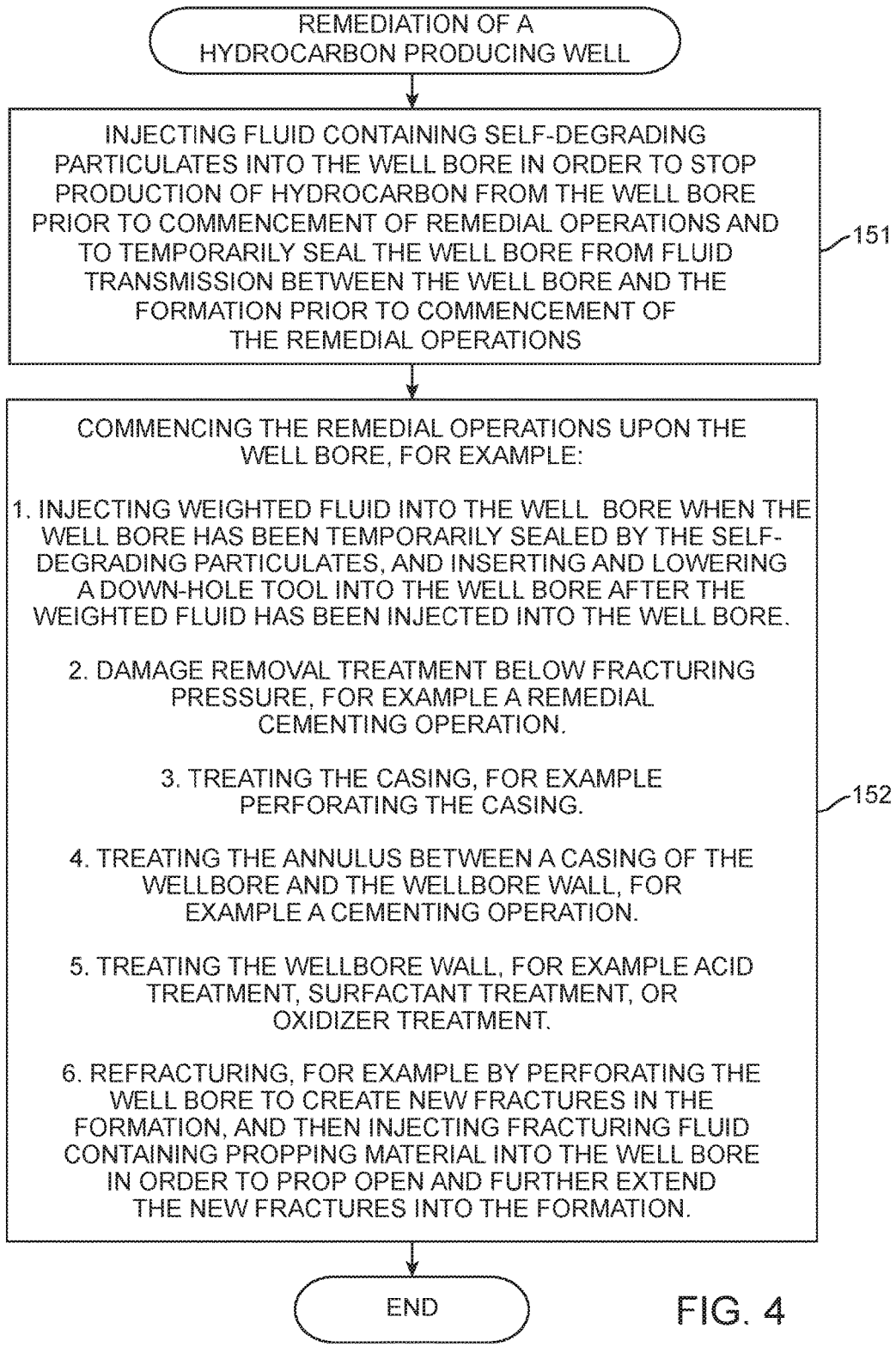
FIG. 4 is a flowchart of operations during remediation of a hydrocarbon producing well in accordance with various examples of the present disclosure.

FIG. 4 shows a method of remediation of a hydrocarbon producing well in accordance with various examples of the present disclosure. The method begins in box 151 with injecting fluid containing self-degrading particulates into the well bore in order to stop production of hydrocarbon from the well bore prior to commencement of remedial operations and to temporarily seal the well bore from fluid transmission between the well bore and the formation prior to commencement of the remedial operations. For example, mixing equipment is used to mix the self-degrading particulates into fluid to produce the fluid containing the self-degrading particulates that is injected into the well bore in order to stop production of hydrocarbon from the well bore, the fluid containing the self-degrading particulates is injected into the well bore using one or more pumps, and the fluid containing the self-degrading particulates is injected into the well bore until a down-hole pressure of the fluid containing the self-degrading particulates exceeds a fracture extending pressure of the subterranean formation surrounding the well bore in order to stop the production of hydrocarbon from the well bore prior to commencement of remedial operations and to temporarily seal the well bore from fluid transmission between the well bore and the formation prior to commencement of the remedial operations.

The method continues in box 152 with commencing the remedial operations upon the well bore. For example, the remedial operations may include injecting weighted fluid into the well bore when the well bore has been sealed by the self-degrading particulates, and lowering a down-hole tool into the well-bore after the weighted fluid has been injected into the well bore. The weighted fluid, for example, includes one or more weighting agents dissolved in or mixed into the drilling fluid, and the weighting agents include common salt, calcium carbonate, iron oxide, or barium sulfate. The weighted fluid can be used to reduce the pressure in the well bore at the surface while maintaining pressure in the well bore below the surface in order to keep the well temporarily sealed. Therefore, the pressure in the well bore can be relieved at surface for insertion of down-hole tools into the well bore at the surface and the lowering of the downhole tools into the well bore while the weighted fluids maintain a pressure differential as a function of depth below the surface to keep hydrocarbons from flowing up to the surface. The initial sealing of the well bore with the self-degrading particulates may reduce the amount of weighted fluids needed for maintaining a desired pressure differential by reducing the amount of weighted fluids that flow into fractures in the formation.

The remedial operations may include damage removal treatment below fracturing pressure, such as a remedial cementing operation. The damage removal treatment may include the use of treatment fluids such as acids, surfactants, and oxidizers, in order to clean out damaged areas or prepare damaged areas for cementing operations.

For the case of cementing operations, the sealing of the well bore may reduce the amount of cement needed for proper bonding to the formation wall of the well bore by preventing hydrocarbon from flowing from the formation into the well bore and preventing the cement from flowing too far into fractures extending from the well bore into the formation.

The remedial operations may include treating the casing, for example, perforating the casing to expose new areas of the surrounding formation for hydraulic fracturing or hydrocarbon production.

The remedial operations may include treatment of the annulus between a casing of the wellbore and the wellbore wall. For example, the annulus treatment may include injection of cement into the annulus.

The remedial operations may include treatment of the well bore wall, for example to increase a flow of hydrocarbon from the wall or to prepare the wall for a cementing operation. The well bore wall treatment may include exposing the well bore wall to treatment fluids such as acid, surfactant, or oxidizer. Typically hydrochloric acid is used for acid treatment to increase porosity by dissolving formation material. Surfactant is used as a wetting agent and as a detergent for dissolution of liquid hydrocarbon. Oxidizer is used for breaking organic polymer, such as acrylic copolymer, used as a gelling agent in fracturing fluid. For example, the oxidizer is ammonium persulfate used with an iron-based activator.

The remedial operations may include a refracturing treatment. For example, the refracturing treatment includes perforating the well bore to create new fractures in the formation, the new fractures extending from the well bore into the formation, and then injecting fracturing fluid containing propping material into the well bore in order to prop open and further extend the new fractures into the formation.

Figure 5:
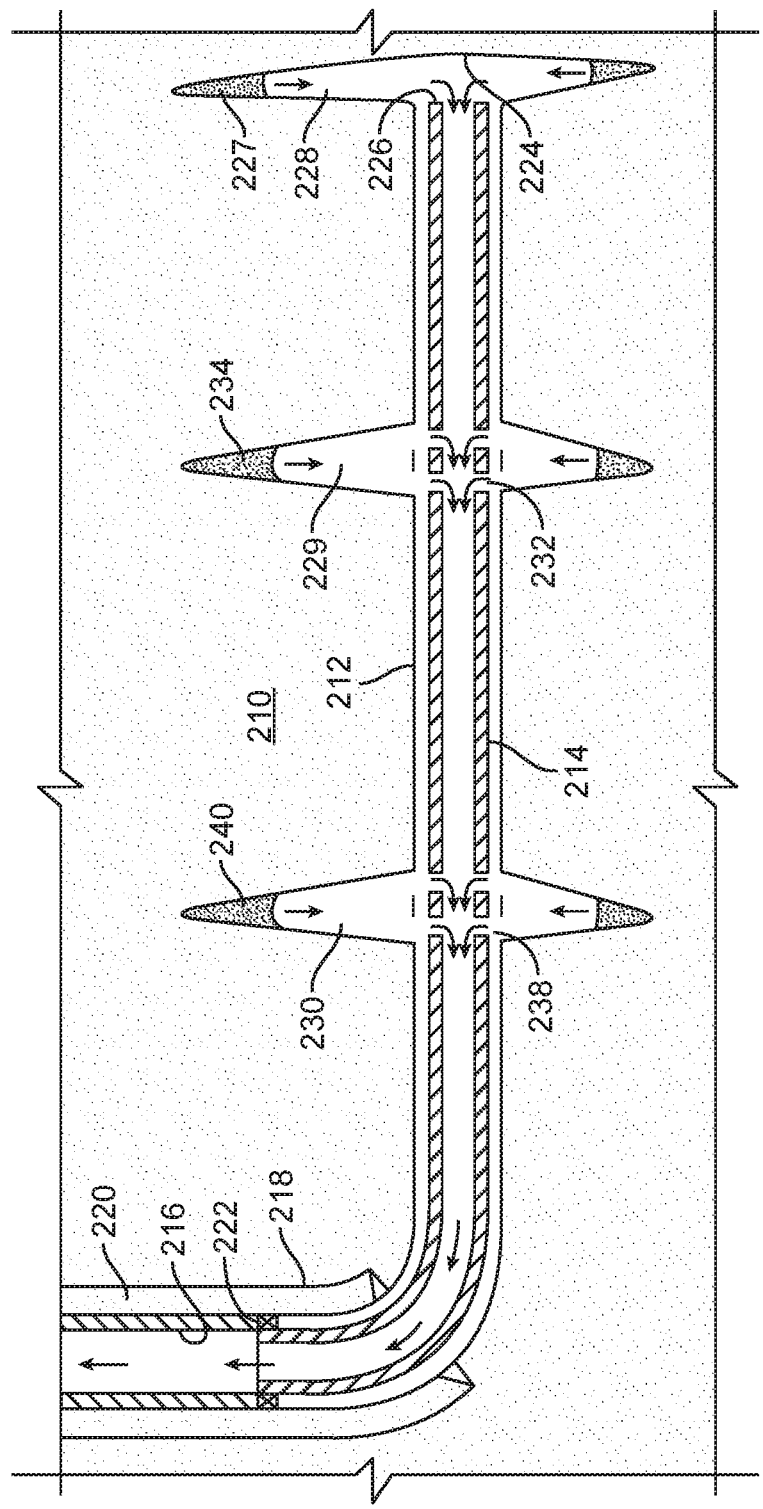
FIG. 5 is a diagram illustrating a fractured producing well bore in need of restimulation.

For example, FIG. 5 shows a fractured producing horizontal open well bore 212 in need of restimulation. The well bore 212 penetrates a subterranean formation 210. Typically, the formation 210 is formed of sandstone or carbonate and contains hydrocarbons in the form of oil, gas or both. An uncemented solid liner 214 having an open end is placed in the horizontal well bore 212. The solid liner 214 has a relatively small diameter without slots or other similar openings in it; e.g., a four and a half inch solid liner. Typically, one end of the liner 214 is hung from a larger diameter casing 216 which may or may not be bonded to the walls of a vertical well bore 218 by a cement sheath 220. The end of the liner 214 within the casing 216 is usually sealed to the casing 216 by a conventional high pressure packer 222. However, if desired or required, other sealing means may be used or the liner 214 may be continuous and extend to the surface.

The liner 214 extends through the horizontal open hole well bore 212 to a point where the deepest fracture is formed, generally within about 1000 feet or nearer to the end 224 of the well bore 212. In this example, the liner 214 is not cemented or otherwise bonded to the walls of the well bore 212, and the end 226 of the liner 214 closest to the end 224 of the well bore 212 is open.

In the formation 210, a hydraulic fracturing process creates fractures 228, 229, and 230 around the borehole 212. For example, fracturing fluid containing proppant can be injected under pressure into the casing 222, and the fracturing fluid flows into the liner 214 to create a fracture 228 in the formation around the end 226 of the liner 212, and to partially fill the fracture 228 with the proppant 227. Then a perforating tool is used to create perforations 232 at a location spaced along the length of the liner 214 from the end 226. Then hydraulic fracturing fluid containing proppant is again injected under pressure into the casing 222 to create the fracture 229 around the perforations 232, and partially fill the fracture 229 with the proppant 234. Then a perforating tool is used to create perforations 238 at a location further spaced along the length of the liner 212 from the end 226. Then hydraulic fracturing fluid containing proppant is again injected under pressure into the casing 222 to create the fracture 230 around the perforations 238, and partially fill the fracture 230 with the proppant 240.

When the pressure of the fracturing fluid is released, hydrocarbon flows (as indicated by the arrows) from the formation 210 through the proppant 227, 234, 240 and into the fractures 228, 229, 230, and then into the horizontal well bore 212 and into the liner 214, and then up into the casing 216.

After a number of years, the hydrocarbon production level will decline to a level of marginal economic viability. At that time the well is evaluated for possible restimulation. In the example of FIG. 5, the horizontal well bore 212 is chosen as a good candidate for restimulation by a remedial operation of refracturing because there is sufficient spacing between the existing fractures 228, 229, 230 to create new fractures that would extend from the horizontal well bore 212 outward to access untapped regions of the formation 210 that are not drained through the existing fractures. Before commencing the refracturing operations, the formation surrounding the horizontal well bore 212 is sealed with self-degrading particulates.

Figure 6:
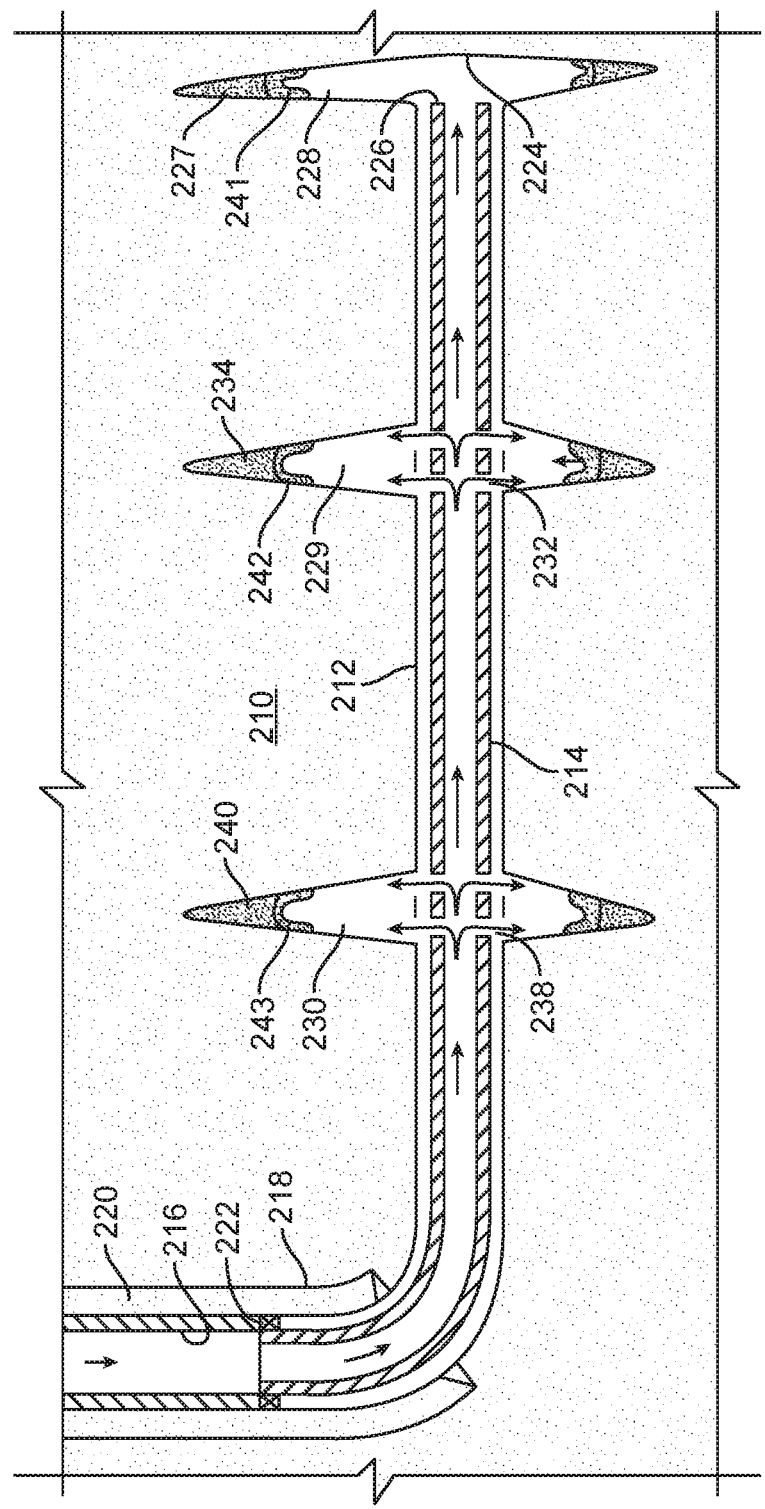
FIG. 6 is a diagram illustrating the sealing of the well bore in FIG. 5 with self-degrading particulates.

FIG. 6 shows the sealing of the well bore 212 with the self-degrading particulates 241, 242, 243. At the surface, the self-degrading particulates are mixed into fracturing fluid such as water and a gelling agent, and the mixture is injected under pressure into the well casing 276 and flows down into the liner 214 and through the perforations 238 into the fracture 230, and further along the liner and through the perforations 232 into the fracture 229, and still further along the liner and out the end 226 into the fracture 228. In each fracture 228, 229, 230, smaller sizes of the self-degrading particulates clog the pores in the surface of the adjacent proppant 241, 242, 243, and larger sizes of the self-degrading particulates build up over the surface of the adjacent proppant. As the two adjacent walls of a fracture separate from each other as the fracture extension pressure is reached and exceeded, the self-degrading particulates fill any gaps created between the walls and the proppant between the walls.

Once the downhole pressure of the fluid in the well bore 212 reaches a level between the fracture breakdown pressure for an unperforated well bore wall and the fracture breakdown pressure for a perforated well bore wall, the pump rate can be reduced to keep the downhole pressure constant while the flow rate decreases to a minimum rate, indicating that the fractures 228, 229, 230 have been sealed at a pressure sufficient for using hydraulic fracturing to extend new fractures from new perforations.

If the fracture breakdown pressure for the unperforated well bore wall is not known, then the pressure is increased by continued pumping of the fluid containing the self-degrading particulates until the rise in pressure levels off in response to some fracture initiation. In other words, the pressure reaches the fracture re-initiation pressure at the point 138 in FIG. 3. Then the pump rate is decreased to zero while the pressure drops to a constant level indicating that these initiated fractures become sealed with the self-degrading particulates.

Once the well bore has become sealed at the high downhole pressure, the well bore is perforated to create new fractures around the new perforations. This can be done without relieving the downhole pressure by lowering a wireline perforating tool down into the casing 216 through a pressure containment facility at the surface. Also weighted fluids can be introduced into the casing 216 while relieving the pressure at the surface so that the downhole pressure can be maintained at a high pressure with a reduced pressure in the well bore at the surface. Thus, the perforating tool can be lowered into the casing 216 when the downhole pressure exceeds the fracture extending pressure of the subterranean formation. Therefore the old fractures can be kept in a sealed condition under pressure while the new fractures are created by the perforating tool and the new fractures are later extended by hydraulic fracturing.

For example, a conventional pressure containment facility has a first value that can be opened to receive a wireline tool into a lubricator chamber and then the first valve can be closed around the wire line of the tool. The pressure containment facility also has a second valve that can be opened to permit the tool to pass from the lubricator chamber into a vertical casing, and then the second valve can be closed around the wire line of the tool. The tool can then be lowered through the vertical casing by pushing the wireline though the valves. The tool can be raised back to the surface by pulling on the wireline at the surface.

The perforating tool may contain explosive shaped charges that can be electrically fired from the surface so that the shaped charges explode and perforate the casing or liner surrounding the perforating tool and further perforate the wall of the well bore surrounding the perforating tool.

Figure 7:
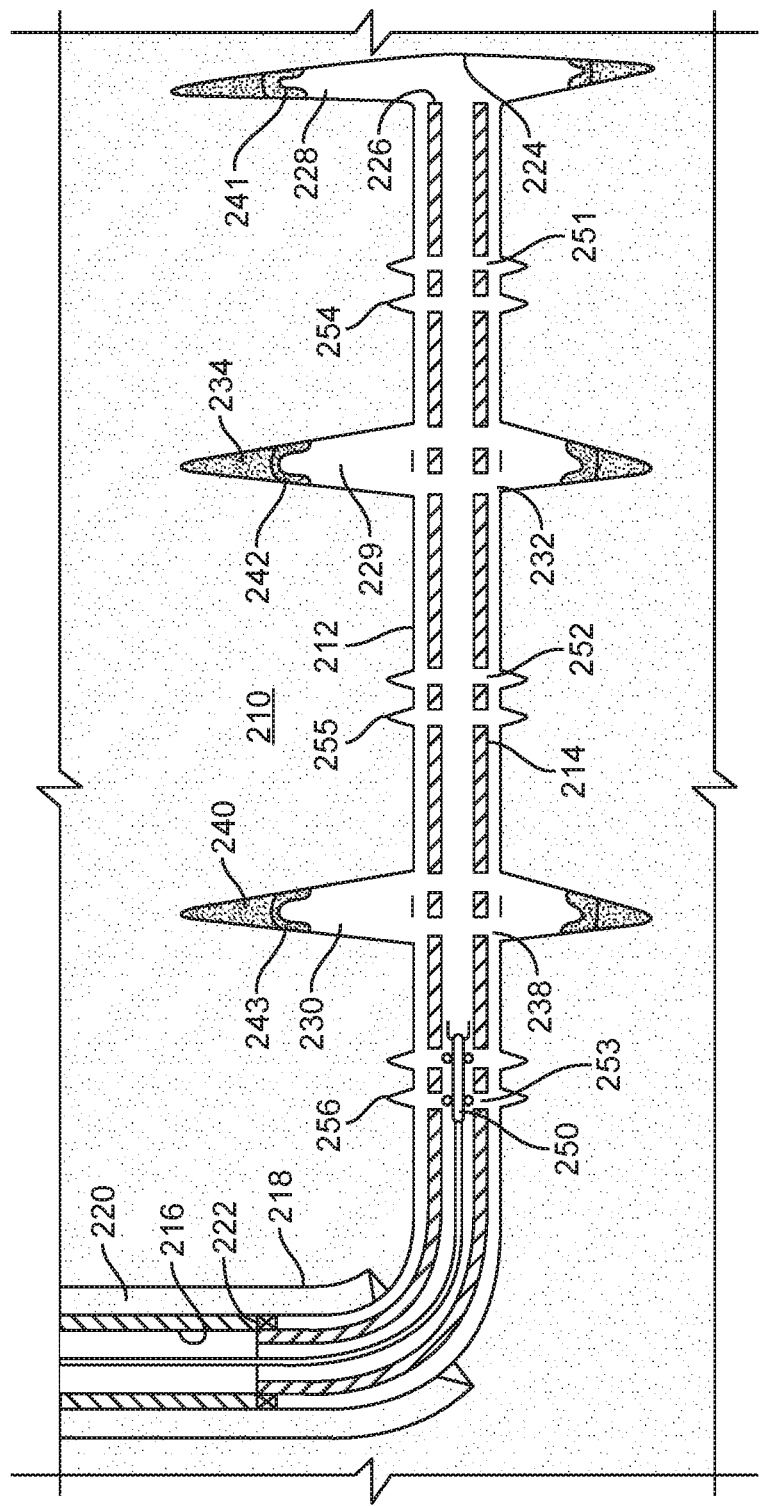
FIG. 7 is a diagram illustrating production of new perforations in the well bore of FIG. 6 to produce new fractures extending from the wellbore into the formation surrounding the well bore.

FIG. 7 shows that a perforating tool 250 has produced new perforations 251, 252, 253 in the liner 214 of the horizontal well bore 212 and new fractures 254, 255, 256 around these new perforations. Then the perforating tool 250 is removed from the well bore 212, in order to begin hydraulic fracturing to extend the new fractures 254, 255, 256 further into the formation. Fracturing fluid containing proppant is pumped under pressure down into the vertical casing 216 so that the fracturing fluid flows into the liner 214 and through the perforations 251, 252, 253 into the horizontal well bore 212. The injection of the fracturing fluid containing propping material into the well bore may include a continuous pumping of the fracturing fluid, with varying levels of the propping material added to the fracturing fluid at different times in accordance with a treatment schedule. An example of a treatment schedule will be further described below with reference to FIG. 10.

Figure 8:
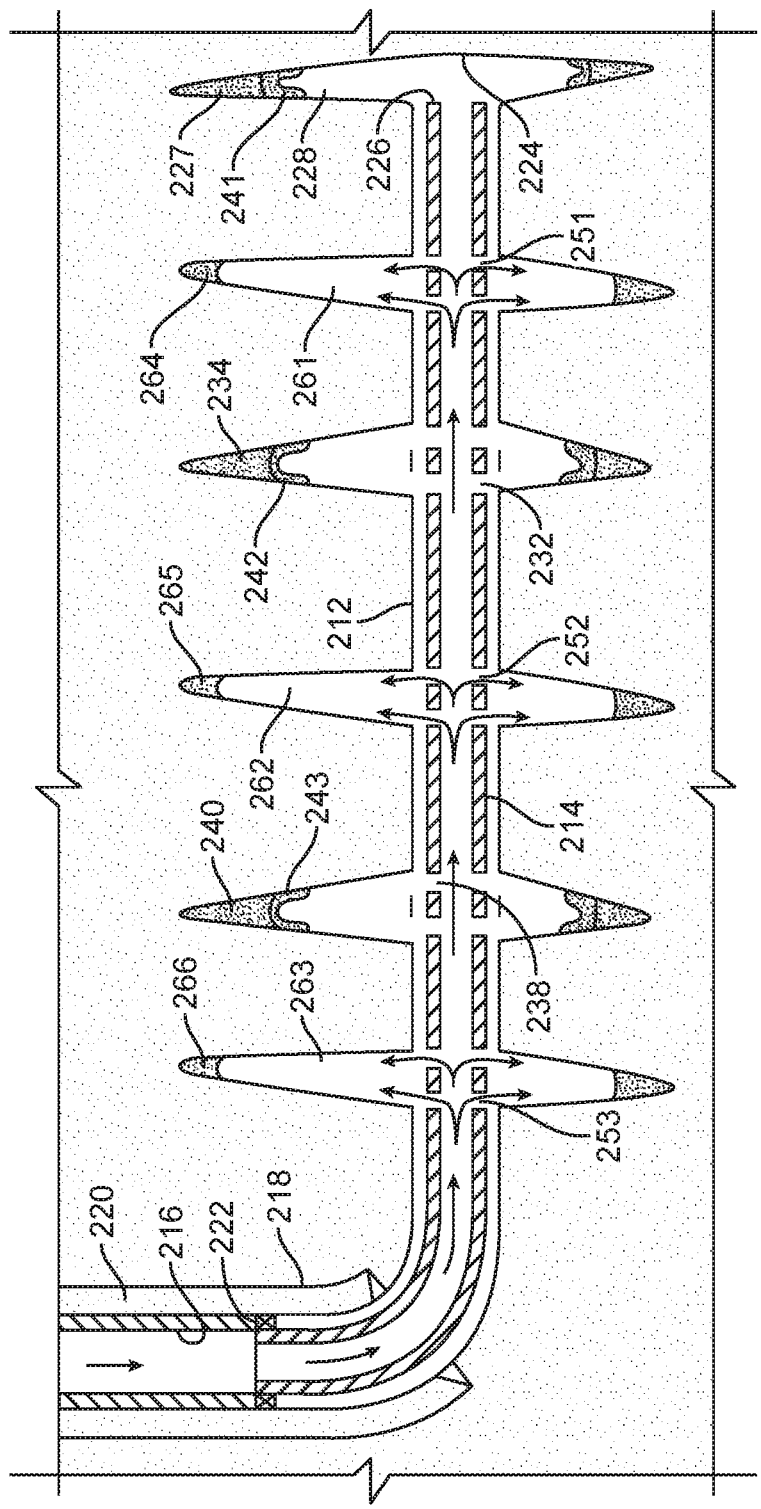
FIG. 8 is a diagram illustrating hydraulic fracturing to extend the new fractures of FIG. 7 further into the formation surrounding the well bore.

FIG. 8 shows that hydraulic fracturing has produced extended fractures 261, 262, 263 surrounding the perforations 251, 252, 253, and has deposited the proppant 264, 265, 266 between the walls of the fractures 261, 262, 263 at the extremities of the fractures away from the well bore 212. When the fracturing has been completed, the down-hole pressure is relieved, and then the proppant keeps the fractures open so that hydrocarbon flows from the foundation into the fractures.

Figure 9:
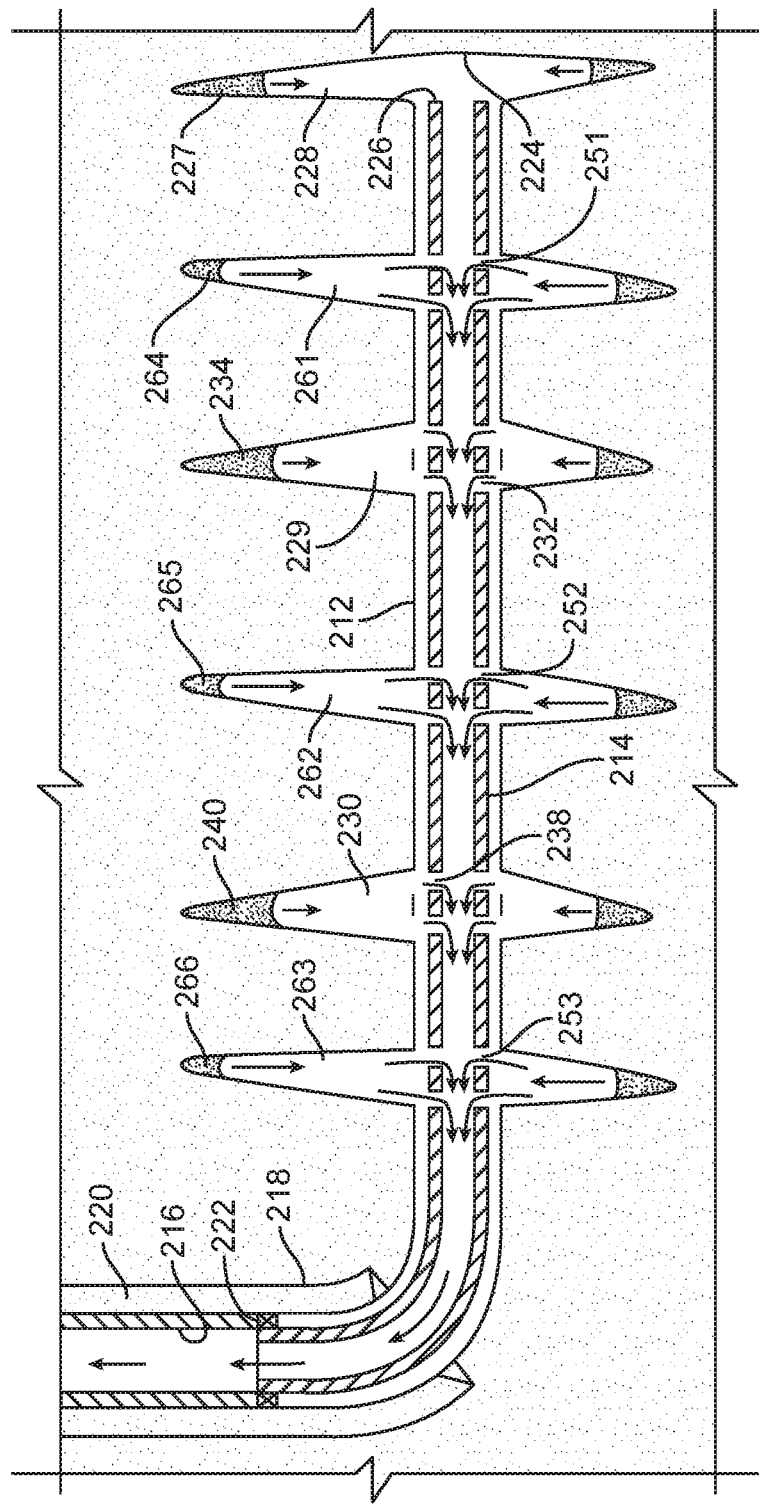
FIG. 9 is a diagram illustrating the well bore of FIG. 8 producing hydrocarbon after degradation of the self-degrading particulates.

FIG. 9 shows the horizontal well bore 212 producing hydrocarbon after degradation of the self-degrading particulates. Then hydrocarbon is produced from each of the fractures, and the new fractures 261, 262, 263 produce more hydrocarbon than the old fractures 228, 229, 230.

Figure 10:
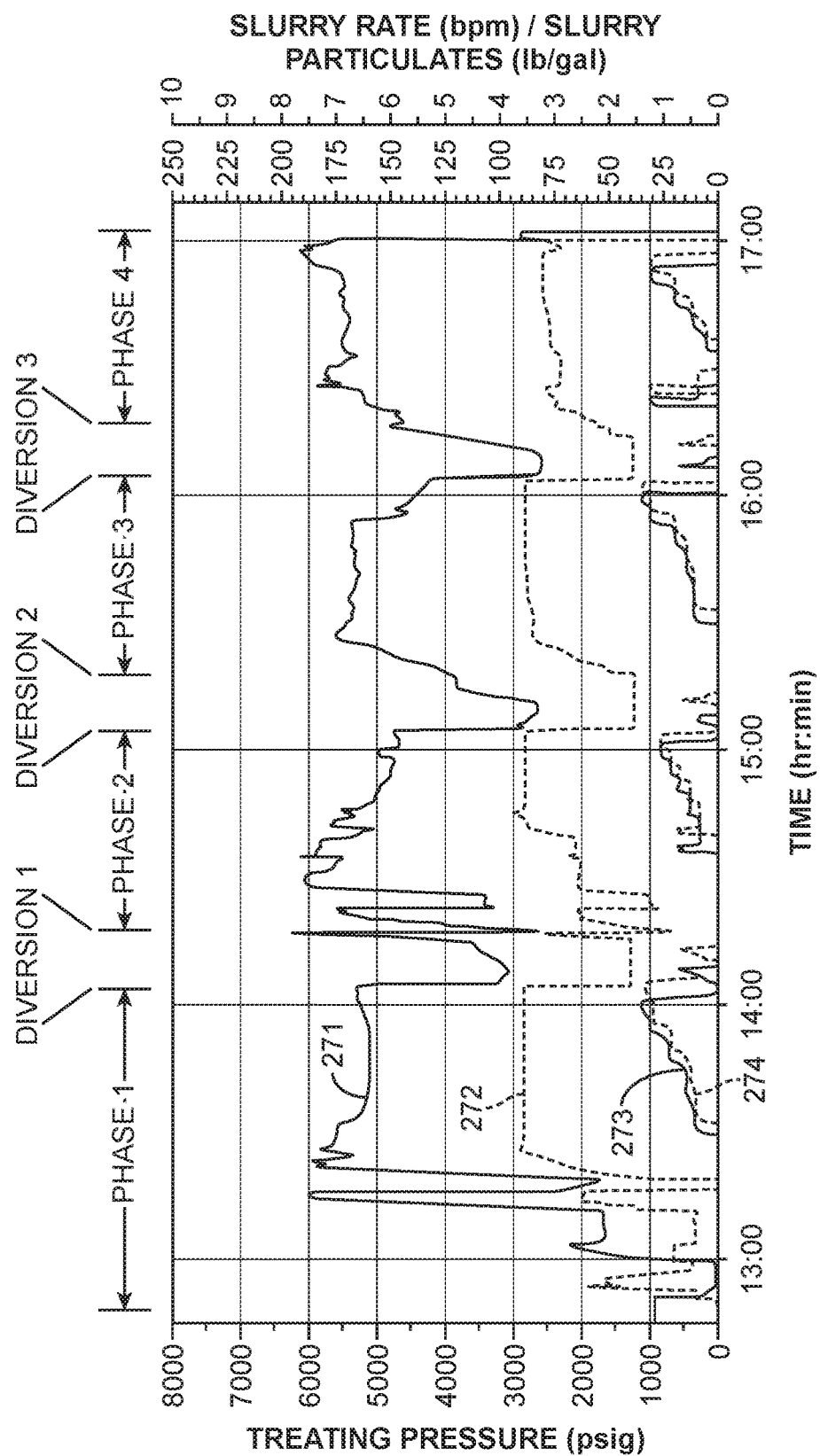
FIG. 10 is a diagram illustrating a treatment schedule for the hydraulic fracturing of FIG. 8.

FIG. 10 shows a conventional treatment schedule for hydraulic re-fracturing. An upper solid line graph 271 is the treatment pressure in pounds per square inch gage (psig) as a function of time. An upper dashed line graph 272 is the slurry or pump rate in barrels per minute (bpm) as a function of time. A lower solid line graph 273 is proppant particulates in pounds per gallon (lb/gal) mixed into the fracturing fluid as a function of time. A lower dashed line graph 274 is self-degrading particulates in pounds per gallon (lb/gal) mixed into the fracturing fluid as a function of time.

The treatment schedule of FIG. 10 includes four phases of injection of the fracturing fluid with the propping material separated by diversion sequences of fluid injection with additional self-degrading particulates. Each treatment phase includes injection of fracturing fluid without particulates, followed by injection of fracturing fluid with particulates. When particulates are injected, the concentration of particulates is an increasing function of time, in a stair-step fashion. The particulates include proppant as well as self-degrading particulates, but the injection of self-degrading particulates is delayed with respect to the injection of proppant. Each diversion includes a pulse of proppant, followed by a pulse of self-degrading particulates. Each diversion results in a down-hole pressure increase when the fracturing fluid pumping rate returns to a maximum rate after the diversion.

The first treatment phase and the first diversion cause the fractures near the inflow of fracturing fluid to be re-fractured first and filled with proppant and self-degrading particulates, so that the inflow of fracturing fluid is then diverted to the fractures further from the inflow of the fracturing fluid. Each treatment phase and its immediately following diversion repeats this process until the entire length of the well bore has been re-fractured. The number of treatment phases is selected depending on the size and length of the well bore. In the example of FIG. 10, the horizontal well bore was approximately 1,700 feet long and was completed with a 5.5 inch casing. The number of treatment phases would be decreased for a shorter well bore, and increased for a longer well bore. The slurry rate (in barrels per minute) would be increased for a larger diameter casing, and decreased for a smaller diameter casing.

As introduced above, the remedial operations commenced after the well bore has been temporarily sealed with the self-degrading particulates may include a cementing operation. The cementing operation involves pumping a cement composition down into the well bore. As used herein, "cement" is any kind of material capable of being pumped to flow to a desired location, and capable of setting into a solid mass at the desired location. Typically the cement is used for cementing well casing to the well bore in order to provide zonal isolation so that fluid is extracted from or delivered to selected zones or layers of the formation and prevented from leaking into other zones or layers of the formation and leaking into the surface environment. The cement also bonds to and supports the casing.

In many cases, common calcium-silicate hydraulic cement is suitable, such as Portland cement. Calcium-silicate hydraulic cement includes a source of calcium oxide such as burnt limestone, a source of silicon dioxide such as burnt clay, and various amounts of additives such as sand, pozzolan, diatomaceous earth, iron pyrite, alumina, and calcium sulfate. In some cases, the cement may include polymer, resin, or latex, either as an additive or as the major constituent of the cement. The polymer may include polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, silicones, and combinations thereof. The cement may also include reinforcing fillers such as fiberglass, ceramic fiber, or polymer fiber. The cement may also include additives for improving or changing the properties of the cement, such as set accelerators, set retarders, defoamers, fluid loss agents, weighting materials, dispersants, density-reducing agents, formation conditioning agents, lost circulation materials, thixotropic agents, suspension aids, or combinations thereof.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 11:
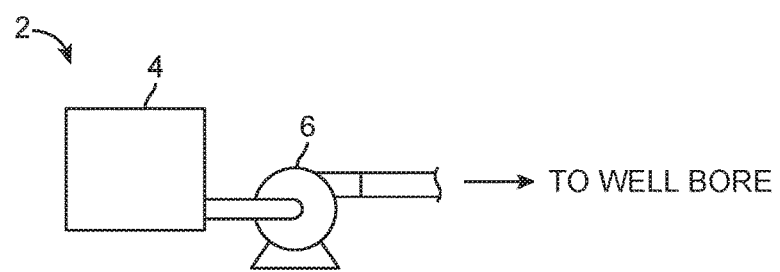
FIG. 11 is a diagram illustrating a system for preparation and delivery of a cement composition to a well bore in accordance with aspects of the present disclosure.

Referring now to FIG. 11, a system that may be used in the preparation of a cement composition in accordance with example embodiments will now be described. FIG. 11 illustrates a system 2 for preparation of a cement composition and delivery to a well bore in accordance with certain embodiments. As shown, the cement composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

Figure 12:
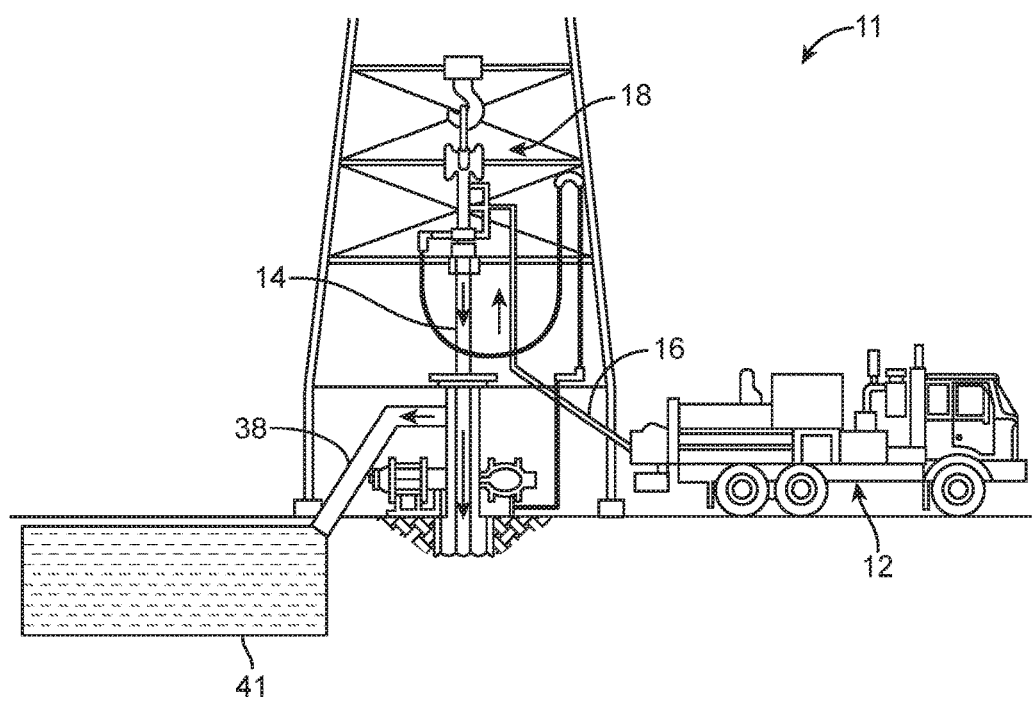
FIG. 12 is a diagram illustrating surface equipment that may be used in placement of a cement composition in a well bore in accordance with aspects of the present disclosure.

An example technique and system for placing a cement composition into a subterranean formation will now be described with reference to FIGS. 12 and 13. FIG. 12 illustrates surface equipment 11 that may be used in placement of a cement composition in accordance with certain embodiments. It should be noted that while FIG. 12 generally depicts a land-based operation, those skilled in the art will readily recognize that the principles described herein are equally applicable to subsea operations that employ floating or sea-based platforms and rigs, without departing from the scope of the disclosure. As illustrated by FIG. 12, the surface equipment 11 may include a cementing unit 12, which may include one or more cement trucks. The cementing unit 12 may include mixing equipment 4 and pumping equipment 6 (e.g., FIG. 11) as will be apparent to those of ordinary skill in the art. The cementing unit 12 may pump a cement composition 14 through a feed pipe 16 and to a cementing head 18 which conveys the cement composition 14 downhole.

Figure 13:
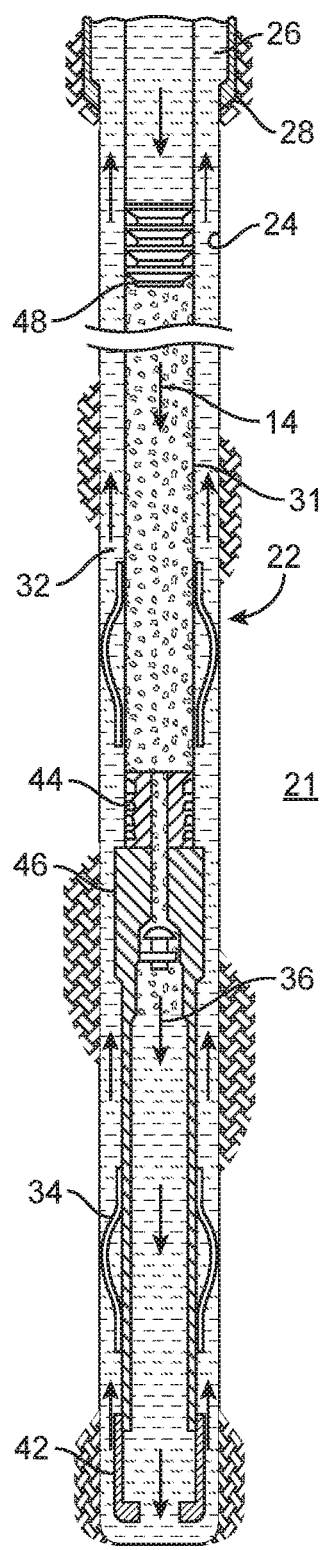
FIG. 13 illustrates placement of a cement composition into a well bore annulus in accordance with aspects of the present disclosure.

Turning now to FIG. 13, the cement composition 14 may be placed into a subterranean formation 21 in accordance with example embodiments. As illustrated, a well bore 22 has been drilled into the subterranean formation 21. While well bore 22 is shown extending generally vertically into the subterranean formation 21, the principles described herein are also applicable to well bores that extend at an angle through the subterranean formation 21, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 31 may also be disposed in the well bore 22. As illustrated, there is a well bore annulus 32 formed between the casing 31 and the walls 24 of the well bore 22 and/or the surface casing 26. One or more centralizers 34 may be attached to the casing 31, for example, to centralize the casing 31 in the well bore 22 prior to and during the cementing operation.

With continued reference to FIG. 13, the cement composition 14 may be pumped down the interior of the casing 31. The cement composition 14 may be allowed to flow down the interior of the casing 31 through the casing shoe 42 at the bottom of the casing 31 and up around the casing 31 into the well bore annulus 32. The cement composition 14 may be allowed to set in the well bore annulus 32, for example, to form a cement sheath that supports and positions the casing 31 in the well bore 22. While not illustrated, other techniques may also be utilized for introduction of the cement composition 14. By way of example, reverse circulation techniques may be used that include introducing the cement composition 14 into the subterranean formation 21 by way of the well bore annulus 32 instead of through the casing 31.

As it is introduced, the cement composition 14 may displace other fluids 36, such as drilling fluids and/or spacer fluids, that may be present in the interior of the casing 31 and/or the well bore annulus 32. At least a portion of the displaced fluids 36 may exit the well bore annulus 32 via a flow line 38 and be deposited, for example, in one or more retention pits 41 (e.g., a mud pit), as shown on FIG. 12. Referring again to FIG. 13, a bottom plug 44 may be introduced into the well bore 22 ahead of the cement composition 14, for example, to separate the cement composition 14 from the fluids 36 that may be inside the casing 31 prior to cementing. After the bottom plug 44 reaches the landing collar 46, a diaphragm or other suitable device ruptures to allow the cement composition 14 through the bottom plug 44. In FIG. 13, the bottom plug 44 is shown on the landing collar 46. In the illustrated embodiment, a top plug 48 may be introduced into the well bore 22 behind the binder composition 14. The top plug 48 may separate the cement composition 14 from a displacement fluid 51 and also push the cement composition 14 through the bottom plug 44.

Injecting cement slurry into a void behind a casing or into a permeable formation is known as "squeeze cementing." For example, isolation of existing producing intervals ahead of a remedial cement squeeze job can be accomplished, by first pumping self-degrading particles into the wellbore, sealing off the flow path into the reservoir. Remedial squeeze cementing operations can then be conducted in other sections of the well bore without the risk of damaging the flow path into the producing reservoir. After remedial squeeze cementing operations are completed, the self-degrading particles would dissolve and restore the flow path to the producing reservoir without additional well intervention.

Numerous examples are provided herein to enhance understanding of the present disclosure. A specific set of examples are provided as follows.

In a first example, there is disclosed a method of remediation of a hydrocarbon producing well bore in a subterranean formation, said method comprising: (a) injecting fluid containing self-degrading particulates into the well bore in order to stop production of hydrocarbon from the well bore prior to commencement of remedial operations and to temporarily seal the well bore from fluid transmission between the well bore and the formation prior to commencement of the remedial operations; and (b) commencing the remedial operations upon the well bore.

In a second example, there is disclosed a method according to the preceding example, wherein the hydrocarbon producing well has been previously fractured by injection of fracturing fluid from the wellbore into the subterranean formation, and the fluid containing the self-degrading particulates is injected until a down-hole pressure of the fluid containing the self-degrading particulates exceeds a fracture extending pressure of the subterranean formation in order to stop the production of hydrocarbon from the well bore prior to commencement of remedial operations and to temporarily seal the well bore from fluid transmission between the well bore and the formation prior to commencement of the remedial operations.

In a third example, there is disclosed a method according to any of the preceding examples, wherein the remedial operations include injecting weighted fluid into the well bore.

In a fourth example, there is disclosed a method according to any of the preceding examples, wherein the remedial operations include inserting and lowering a down-hole tool into the well bore after the weighted fluid has been injected into the well bore.

In a fifth example, there is disclosed a method according to any of the preceding examples, further comprising mixing the self-degrading particulates into fluid using mixing equipment to produce the fluid containing the self-degrading particulates that is injected into the well bore in order to stop the production of hydrocarbon from the well bore.

In a sixth example, there is disclosed a method according to any of the preceding examples, wherein the fluid containing the self-degrading particulates is injected into the well bore using one or more pumps.

In a seventh example, there is disclosed a method according to any of the preceding examples, wherein the remedial operations include a damage removal treatment below fracturing pressure.

In an eighth example, there is disclosed a method according to any of the preceding examples, wherein the remedial operations include a casing treatment.

In a ninth example, there is disclosed a method according to any of the preceding examples, wherein the remedial operations includes an annulus treatment.

In a tenth example, there is disclosed a method according to any of the preceding examples, wherein the remedial operations include a well bore wall treatment.

In an eleventh example, there is disclosed a method according to any of the preceding examples, wherein the remedial operations include a cementing operation.

In a twelfth example, there is disclosed a method according to the preceding eleventh example, wherein the cementing operation includes mixing components of a cement composition using mixing equipment.

In a thirteenth example, there is disclosed a method according to the preceding eleventh example, wherein the cementing operation includes introducing a cement composition into the well bore using one or more pumps.

In a fourteenth example, there is disclosed a method according to any of the preceding examples, wherein the remedial operations include a refracturing treatment.

In a fifteenth example, there is disclosed a method according to the preceding fourteenth example, wherein the refracturing treatment includes introducing fracturing fluid into the well bore using one or more pumps.

In a sixteenth example, there is disclosed a method according to any of the preceding examples, wherein the fluid containing the self-degrading particulates is injected until a down-hole pressure of the fluid containing the self-degrading particulates reaches a re-fracture initiation pressure at which new fractures are initiated in the formation and the self-degrading particulates are unable to seal the new fractures initiated in the formation.

In a seventeenth example, there is disclosed a method according to any of the preceding examples, wherein the refracturing treatment includes perforating the well bore to create new fractures in the formation, the new fractures extending from the well bore into the formation, and then injecting fracturing fluid containing propping material into the well bore in order to prop open and further extend the new fractures into the formation.

In an eighteenth example, there is disclosed a method according to any of the preceding examples, wherein the well bore is perforated by a perforating tool lowered into the well bore when the downhole pressure exceeds the fracture extending pressure of the subterranean formation.

In a nineteenth example, there is disclosed a method according to any of the preceding examples, wherein the fluid containing the self-degrading particulates is injected until a down-hole pressure of the fluid containing the self-degrading particulates exceeds a fracture breakdown pressure of the new fractures in order to stop production of the hydrocarbon from the well bore prior to commencement of the operations and to temporarily seal the well bore from fluid transmission between the well bore and the formation prior to commencement of the remedial operations.

In twentieth example, there is disclosed a method according to any of the preceding examples, wherein the injection of the fracturing fluid containing propping material into the well bore includes a continuous pumping of the fracturing fluid, with varying levels of the propping material added to the fracturing fluid at different times in accordance with a treatment schedule, and the treatment schedule includes multiple phases of injection of the fracturing fluid with the propping material separated by diversion sequences of fluid injection with additional self-degrading particulates.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A method of remediation of a hydrocarbon producing well bore in a subterranean formation, said method comprising:
   (a) injecting fluid containing self-degrading particulates into a well bore until a down-hole pressure of the fluid containing the self-degrading particulates exceeds a fracture extending pressure and is not greater than a fracture breakdown pressure of the subterranean formation to stop production of hydrocarbon from the well bore prior to commencement of remedial operations and to temporarily seal the well bore from fluid transmission between the well bore and a formation prior to commencement of the remedial operations; and
   (b) commencing the remedial operations upon the well bore,
   wherein, when the down-hold pressure of the fluid containing the self-degrading particulates exceeds the fracture extending pressure, previously existing fractures are not re-extended due to the self-degrading particulates.

2. The method as claimed in claim 1, wherein the well bore has been previously fractured by injection of fracturing fluid from the wellbore into the subterranean formation.

3. The method as claimed in claim 1, wherein the remedial operations include injecting weighted fluid into the well bore.

4. The method as claimed in claim 3, wherein the remedial operations include inserting and lowering a down-hole tool into the well bore after the weighted fluid has been injected into the well bore.

5. The method as claimed in claim 1, further comprising mixing the self-degrading particulates into fluid using mixing equipment to produce the fluid containing the self-degrading particulates that is injected into the well bore to stop the production of hydrocarbon from the well bore.

6. The method as claimed in claim 1, wherein the fluid containing the self-degrading particulates is injected into the well bore using one or more pumps.

7. The method as claimed in claim 1, wherein the remedial operations include a damage removal treatment below fracturing pressure.

8. The method as claimed in claim 1, wherein the remedial operations include a casing treatment.

9. The method as claimed in claim 1, wherein the remedial operations includes an annulus treatment.

10. The method as claimed in claim 1, wherein the remedial operations include a well bore wall treatment.

11. The method as claimed in claim 1, wherein the remedial operations include a cementing operation.

12. The method as claimed in claim 11, wherein the cementing operation includes mixing components of a cement composition using mixing equipment.

13. The method as claimed in claim 11, wherein the cementing operation includes introducing a cement composition into the well bore using one or more pumps.

14. The method as claimed in claim 1, wherein the remedial operations include a refracturing treatment.

15. The method as claimed in claim 14, wherein the refracturing treatment includes introducing fracturing fluid into the well bore using one or more pumps.

16. The method as claimed in claim 14, wherein the fluid containing the self-degrading particulates is injected until a down-hole pressure of the fluid containing the self-degrading particulates reaches a re-fracture initiation pressure at which new fractures are initiated in the formation and the self-degrading particulates are unable to seal the new fractures initiated in the formation.

17. The method as claimed in claim 14, wherein the refracturing treatment includes perforating the well bore to create new fractures in the formation, the new fractures extending from the well bore into the formation, and then injecting fracturing fluid containing propping material into the well bore to prop open and further extend the new fractures into the formation.

18. The method as claimed in claim 17, wherein the well bore is perforated by a perforating tool lowered into the well bore when the downhole pressure exceeds the fracture extending pressure of the subterranean formation.

19. The method as claimed in claim 17, wherein the injection of the fracturing fluid containing propping material into the well bore includes a continuous pumping of the fracturing fluid, with levels of the propping material added to the fracturing fluid at different times in accordance with a treatment schedule, and the treatment schedule includes multiple phases of injection of the fracturing fluid with the propping material separated by diversion sequences of fluid injection with additional self-degrading particulates.

20. The method as claimed in claim 14, wherein when the refracturing treatment is performed, the down-hole pressure exceeds the fracture extending pressure and is not greater than the fracture breakdown pressure.

* * * * *